United States Patent
Sasaki et al.

(10) Patent No.: US 10,161,498 B2
(45) Date of Patent: Dec. 25, 2018

(54) GEAR BOX

(71) Applicant: Sumitomo Heavy Industries, Ltd., Tokyo (JP)

(72) Inventors: Yasuhiko Sasaki, Kanagawa (JP); Kazuhisa Abe, Aichi (JP); Ryosuke Yahara, Aichi (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 98 days.

(21) Appl. No.: 15/273,292

(22) Filed: Sep. 22, 2016

(65) Prior Publication Data

US 2017/0009869 A1   Jan. 12, 2017

Related U.S. Application Data

(63) Continuation of application No. PCT/JP2015/054006, filed on Feb. 13, 2015.

(30) Foreign Application Priority Data

Mar. 31, 2014   (JP) ................................. 2014-072796

(51) Int. Cl.
   *F16H 57/02*    (2012.01)
   *F16H 57/021*   (2012.01)
   (Continued)

(52) U.S. Cl.
   CPC ......... *F16H 57/021* (2013.01); *F16H 57/025* (2013.01); *F16H 57/03* (2013.01)

(58) Field of Classification Search
   CPC ...... F16H 57/021; F16H 57/025; F16H 57/03; F16H 57/037; F16H 2057/0213; F16H 2057/0216
   See application file for complete search history.

(56) References Cited

U.S. PATENT DOCUMENTS 1,746,599 A  *  2/1930  Mahan ................... F16H 57/025
                                                74/325
1,861,941 A  *  6/1932  Ira ........................... F16H 1/206
                                                74/606 R
(Continued)

FOREIGN PATENT DOCUMENTS

DE   102010010816 A1  *  9/2011  ......... F16H 57/0423
GB        285241 A        2/1928
(Continued)

OTHER PUBLICATIONS

International Search Report issued in Application No. PCT/JP2015/054006, dated Apr. 28, 2015.

*Primary Examiner* — Adam D Rogers
(74) *Attorney, Agent, or Firm* — Michael Best & Friedrich LLP

(57) ABSTRACT

A gear box includes a gear box body for accommodating a gear, multiple shaft holes which are formed on a side wall portion of the gear box body to support a shaft, a fixing portion which is provided in the gear box body and on which a fixing member for installing the gear box body on an installation surface parallel to the shaft is mounted, and an output hole reinforcement rib which is formed on the side wall portion and extends from a peripheral edge portion of an output shaft hole for supporting an output shaft among the multiple shaft holes toward the fixing portion.

16 Claims, 12 Drawing Sheets

(51) Int. Cl.
  *F16H 57/03* (2012.01)
  *F16H 57/025* (2012.01)

(56) References Cited

U.S. PATENT DOCUMENTS

| | | | |
|---|---|---|---|
| 2,270,980 A | 1/1942 | Tidball et al. | |
| 3,029,661 A * | 4/1962 | Schmitter | F16H 1/20 184/6.12 |
| 7,004,636 B2 * | 2/2006 | Deschler | F16C 35/00 384/456 |
| 7,810,412 B2 * | 10/2010 | Yamasaki | F16H 57/0006 464/180 |
| 8,911,312 B2 * | 12/2014 | Itoo | F16H 57/03 474/93 |
| 2012/0024098 A1 * | 2/2012 | Strau | F16H 57/0447 57/447 |
| 2015/0377339 A1 * | 12/2015 | Barton | F16H 57/021 74/405 |
| 2016/0017980 A1 * | 1/2016 | Wu | F16H 57/021 74/606 R |
| 2016/0258525 A1 * | 9/2016 | Wu | F16H 57/03 |
| 2016/0265650 A1 * | 9/2016 | Wu | F16H 57/0421 |
| 2016/0273646 A1 * | 9/2016 | Wu | F16H 57/03 |
| 2017/0219081 A1 * | 8/2017 | Abe | F16H 57/025 |
| 2018/0086200 A1 * | 3/2018 | Simon | B60K 17/28 |

FOREIGN PATENT DOCUMENTS

| | | |
|---|---|---|
| JP | 2002-021986 A | 1/2002 |
| JP | 2013-137091 A | 7/2013 |

* cited by examiner

_US 10,161,498 B2_

GEAR BOX

RELATED APPLICATIONS

Priority is claimed to Japanese Patent Application No. 2014-072796, filed Mar. 31, 2014, and International Patent Application No. PCT/JP2015/054006, the entire content of each of which is incorporated herein by reference.

BACKGROUND

Technical Field

Certain embodiments of the present invention relate to a gear box which is used in a speed reducer or the like.

Description of Related Art

The related art discloses a gear device in which a side wall portion of a gear box body is installed on an installation surface such as a floor surface or the like.

SUMMARY

An aspect of the present invention relates to a gear box. The gear box includes a gear box body for accommodating a gear; multiple shaft holes which are formed on a side wall portion of the gear box body to support a shaft; a fixing portion which is provided in the gear box body and on which a fixing member for installing the gear box body on an installation surface parallel to the shaft is mounted; and an output hole reinforcement rib which is formed on the side wall portion and extends from a peripheral edge portion of an output shaft hole for supporting an output shaft among the multiple shaft holes toward the fixing portion.

DETAILED DESCRIPTION

A gear device requires a structure in which a decrease in weight of a gear box body can be realized while the strength of the gear box body is secured. The inventors have recognized that there is room for improvement with respect to the structure of a gear box in order to realize this requirement.

It is desirable to provide a gear box in which the weight of the gearbox is decreased while the strength thereof is secured.

According to an embodiment of the present invention, it is possible to provide a gear box in which the weight of the gear box is decreased while the strength thereof is secured.

First Embodiment

Figure 1:
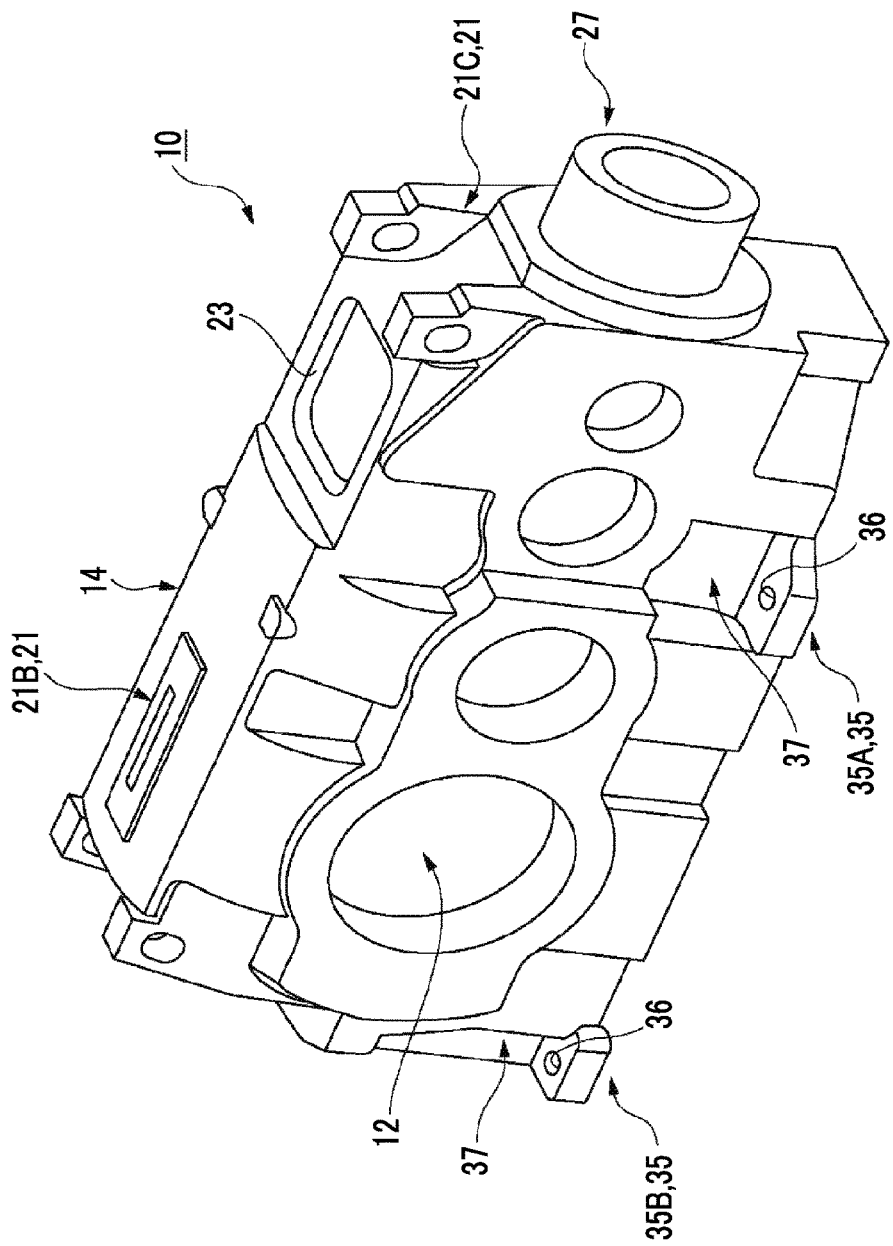
FIG. 1 is a perspective view showing an outline of a gear box according to a first embodiment.

FIG. 1 is a perspective view showing an outline of a gear box 10 according to a first embodiment. The gear box 10 includes a gear box body 14, and an accommodation space 12 for accommodating multiple gears (not shown) or multiple shafts (not shown) is formed inside the gear box body 14.

Figure 2:
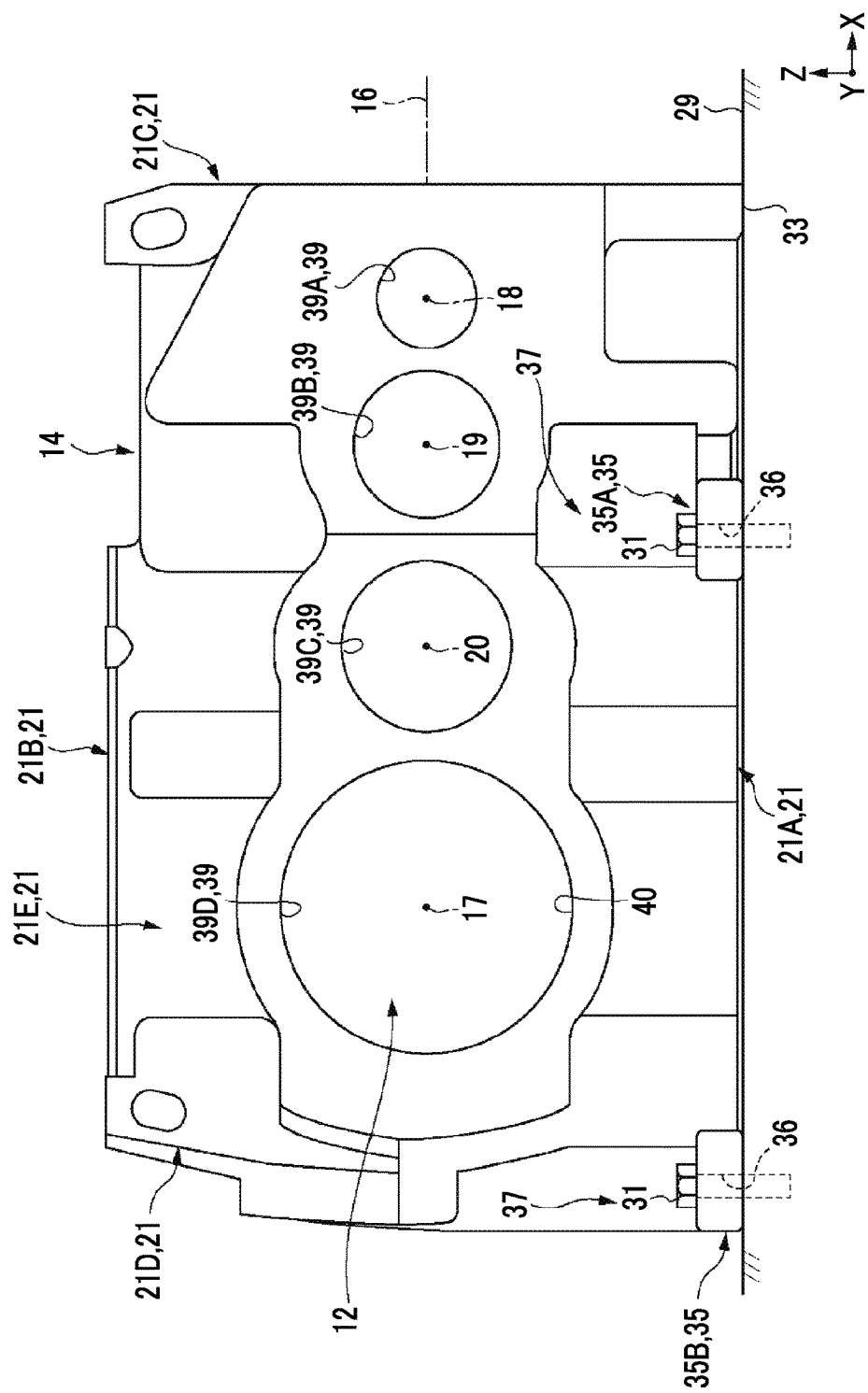
FIG. 2 is a side view showing an outline of the gear box according to the first embodiment.

FIG. 2 is a side view showing the outline of the gear box 10. In FIG. 2, the axial center position of each of shafts 16 to 20 which are assembled to the gear box body 14 is indicated by a point or a dashed line. The gear box 10 is used in an orthogonal speed reducer which reduces a rotating speed of the input shaft 16 and outputs the rotation from an output shaft 17. Multiple reduction gears which reduce the rotating speed of the input shaft 16 to transmit the rotation to the output shaft 17 are accommodated in the accommodation space 12 of the gear box body 14. The multiple reduction gears are attached to each of the input shaft 16, the output shaft 17, and a first intermediate shaft 18, a second intermediate shaft 19, and a third intermediate shaft 20 described below.

The gear box body 14 is formed in an approximately rectangular parallelepiped shape, and is configured of a casting using a steel material or the like, a cut workpiece, or the like. In the gear box body 14, the accommodation space 12 is formed so as to be surrounded by multiple side wall portions 21. The side wall portion 21 includes a lower side wall portion 21A, an upper side wall portion 21B, a front side wall portion 21C, a rear side wall portion 21D, and a pair of lateral side wall portions 21E. The lateral side wall portions 21E are provided on both sides in an axial direction of the output shaft 17. Hereinafter, one direction parallel to an installed surface 33 (described below) of the lower side wall portion 21A is referred to as a front-rear direction X, a direction which is parallel to the installed surface 33 and is orthogonal to the front-rear direction X is referred to as a right-left direction Y, and a direction which is orthogonal to the installed surface 33 is referred to as an up-down direction Z. In addition, the right-left direction Y is coincident with the axial direction of the output shaft 17.

Figure 3:
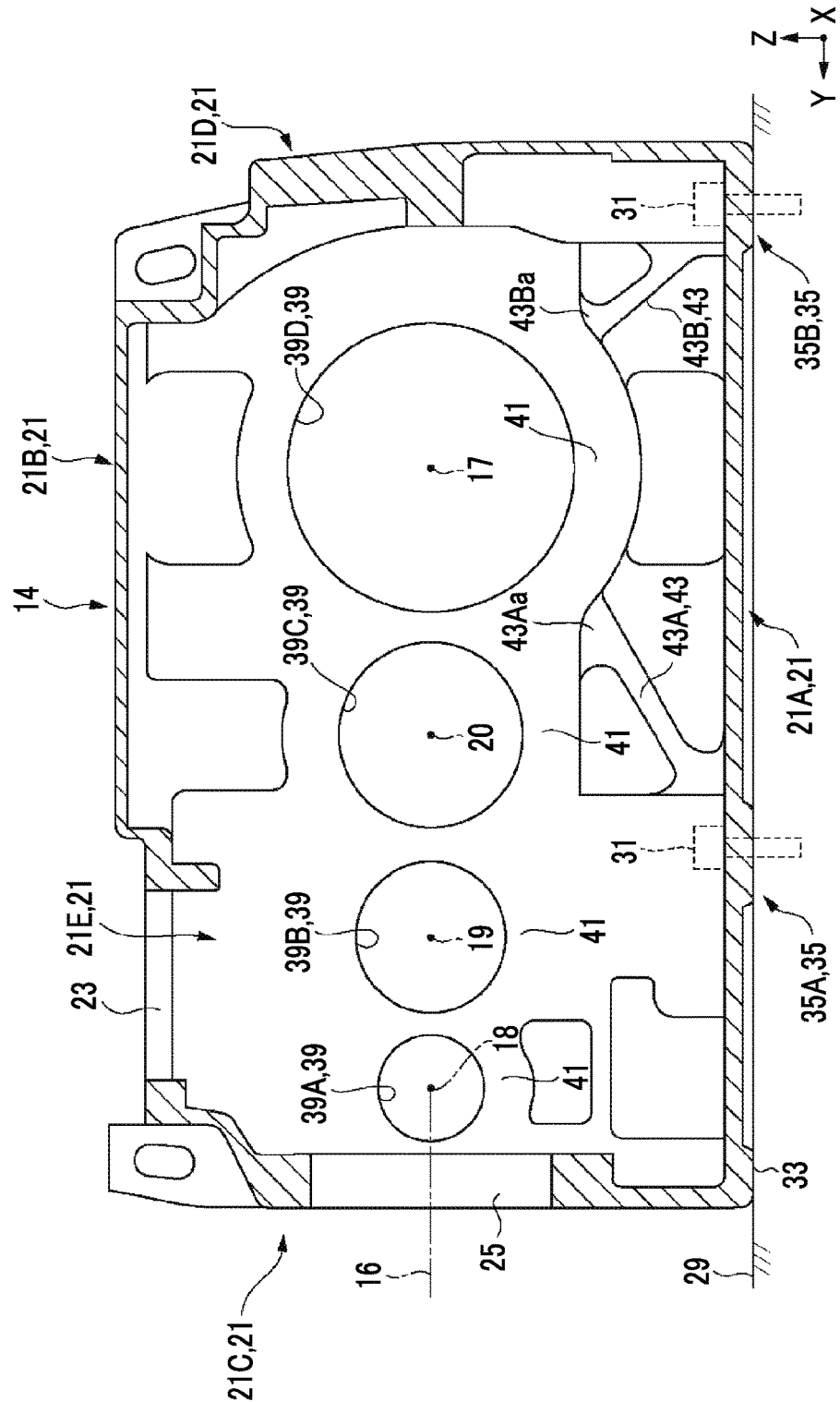
FIG. 3 is a side view showing the internal configuration of the gear box according to the first embodiment.

FIG. 3 is a side view showing the internal configuration of the gear box body 14. An inspection port 23 for inspecting the inner portion of the gear box body 14 is formed on the upper side wall portion 21B. A cover member (not shown) for closing the inspection port 23 can be mounted on the upper side wall portion 21B by a bolt or the like.

An input shaft hole 25 into which the input shaft 16 is inserted and passes is formed on the front side wall portion 21C. As shown in FIG. 1, a bearing casing 27 for housing a bearing (not shown) is assembled to the input shaft hole 25, and the input shaft 16 is supported by the inner wall surface of the input shaft hole 25 via the bearing.

As shown in FIG. 2, in the lower side wall portion 21A, a flat plate-shaped fixing portion 35, on which fixing members 31 for installing the gear box body 14 to an installation surface 29 is mounted, is provided. The installation surface 29 is an outer surface of a driven device, a floor surface in the vicinity thereof, or the like. The fixing portions 35 are provided at positions close to both end portions of the lower side wall portion 21A in the right-left direction Y. The fixing portions 35 includes a first fixing portion 35A and a second fixing portion 35B which are provided so as to be away from each other in the front-rear direction X. The first fixing portion 35A is provided at the intermediate portion in the front-rear direction X, and the second fixing portion 35B is provided on the rear end portion in the front-rear direction X.

The fixing portion 35 includes an insertion hole 36 into which a bolt serving as the fixing member 31 is inserted. The gear box body 14 is fixed to the installation surface 29 by the fixing members 31 in a state where the installed surface 33 of the lower side wall portion 21A facing the installation surface 29 is placed on the installation surface 29.

In the lateral side wall portion 21E, recessed portions 37 are formed at positions deviated in a direction away from the installed surface 33 with respect to the fixing portion 35. The recessed portions 37 are recessed inward from the gear box body 14. A head portion of a bolt serving as the fixing member 31 is accommodated in each of the recessed portions 37.

Multiple shaft holes 39 for supporting the shafts 17 to 20 are formed on the lateral side wall portion 21E. The shaft holes 39 are formed at intervals in the front-rear direction X. The first intermediate shaft 18, the second intermediate shaft 19, the third intermediate shaft 20, and the output shaft 17 are respectively inserted into the shaft holes 39 from the front end side toward the rear end side. Each of the shafts 17 to 20 is supported by an inner wall surface of the corresponding shaft hole 39 via a bearing (not shown) which is assembled to the shaft hole 39. Hereinafter, the shaft holes 39, which respectively support the first intermediate shaft 18, the second intermediate shaft 19, and the third intermediate shaft 20, are referred to as a first intermediate shaft hole 39A, a second intermediate shaft hole 39B, and a third intermediate shaft hole 39C, and the shaft hole 39 which supports the output shaft 17 is referred to as an output shaft hole 39D. With respect to the output shaft hole 39D, the first fixing portion 35A is provided on one side in the front-rear direction X, and the second fixing portion 35B is provided on the other side in the front-rear direction X.

As shown in FIG. 3, a peripheral edge portion 41 of each of the shaft holes 39 is formed on the inner surface side of the lateral side wall portion 21E so as to be thicker than other portions in the right-left direction Y. Output hole reinforcement ribs 43 which extend from the peripheral edge portion 41 of the output shaft hole 39D toward the fixing portion 35 are formed on the inner surface side of the lateral side wall portion 21E. The output hole reinforcement ribs 43 include a first output hole reinforcement rib 43A and a second output hole reinforcement rib 43B. The first output hole reinforcement rib 43A extends from the peripheral edge portion 41 of the output shaft hole 39D toward the first fixing portion 35A. The second output hole reinforcement rib 43B extends from the peripheral edge portion 41 toward the second fixing portion 35B.

Each output hole reinforcement rib 43 is formed so as to be inclined with respect to the installed surface 33. When the gear box body 14 is viewed from the side, the output hole reinforcement ribs 43 are formed to linearly extend in a direction opposite to each other in a state where the axial center (the same position as the axial center of the output shaft 17) of the output shaft hole 39D is interposed therebetween. The output hole reinforcement ribs 43 are formed so as to be widened from the intermediate portion therebetween toward both end portions.

One end portion 43Aa of the first output hole reinforcement rib 43A extends to a portion between the peripheral edge portion 41 of the output shaft hole 39D and the peripheral edge portion 41 of the third intermediate shaft hole 39C and is connected to the portion. One end portion 43Ba of the second output hole reinforcement rib 43B extends to the peripheral edge portion 41 of the output shaft hole 39D and is connected to the peripheral edge portion 41.

Figure 4:
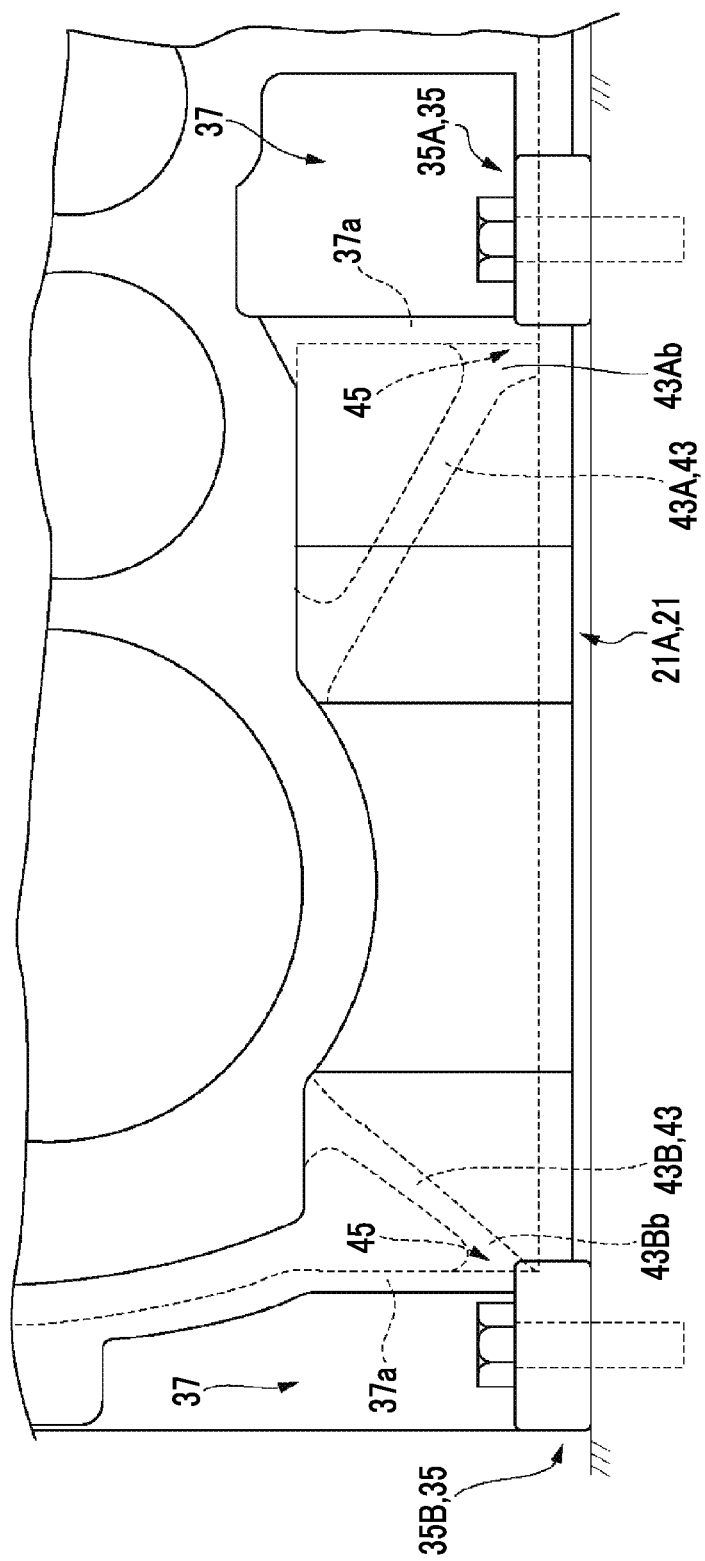
FIG. 4 is an enlarged side view showing the outline of the gear box according to the first embodiment.

FIG. 4 is an enlarged side view showing the outline of the gearbox 10. The other end portion 43Ab of the first output hole reinforcement rib 43A extends to a corner portion 45 between a side surface portion 37a of the recessed portion 37 of the first fixing portion 35A and the lower side wall portion 21A, and is connected to the corner portion 45. The other end portion 43Bb of the second output hole reinforcement rib 43B extends to the corner portion 45 between the side surface portion 37a of the recessed portion 37 of the second fixing portion 35B and the lower side wall portion 21A, and is connected to the side surface portion 37a of the recessed portion 37.

Hereinafter, effects of the gear box 10 will be described. If power is applied to each gear in a state where each fixing portion 35 is fixed to the installation surface 29 by the fixing member 31, deformation of the gear box body 14 around the output shaft 17 is restricted by the fixing member 31. Here, the deformation means deformation of the gear box body 14 generated by meshing reaction forces of gears. In this case, excessive stress easily acts on the vicinity of each fixing portion 35. Particularly, excessive stress from the output shaft 17 more easily acts on the inner wall surface 40 (refer to FIG. 2) of the output shaft hole 39D than other shafts 18 to 20, and an excessive load easily acts on the vicinity of the fixing portion 35 positioned around the output shaft hole 39D.

With respect to this, according to the present embodiment, each output hole reinforcement rib 43 can effectively resist the excessive load, and deformation of the output shaft hole 39D in the right-left direction Y or the up-down direction Z is easily prevented. In addition, since it is possible to effectively resist the excessive load, stress acting on the vicinity of each fixing portion 35 can be released, and the deformation is easily prevented. Accordingly, stiffness and load resistance of the gear box body 14 are easily secured. Therefore, it is not necessary to excessively increase the plate thickness of the lateral side wall portion 21E in order to resist the load, and according to a decrease in the plate thickness of each side wall portion 21, the weight of the gear box body 14 decreased while strength thereof is secured.

The inventors have viewed this, and as a result, according to presence or absence of each output hole reinforcement rib 43, the stress acting on the vicinity of each fixing portion 35 can be decreased 40% or more, and the deformation of the peripheral edge portion 41 of the output shaft hole 39D can be decreased 30% or more. Particularly, compared to a case where each output hole reinforcement rib 43 is formed perpendicularly to the installed surface 33, in a case where each output hole reinforcement rib 43 is formed so as to be inclined, stiffness and load resistance are more effectively obtained.

Second Embodiment

Figure 5:
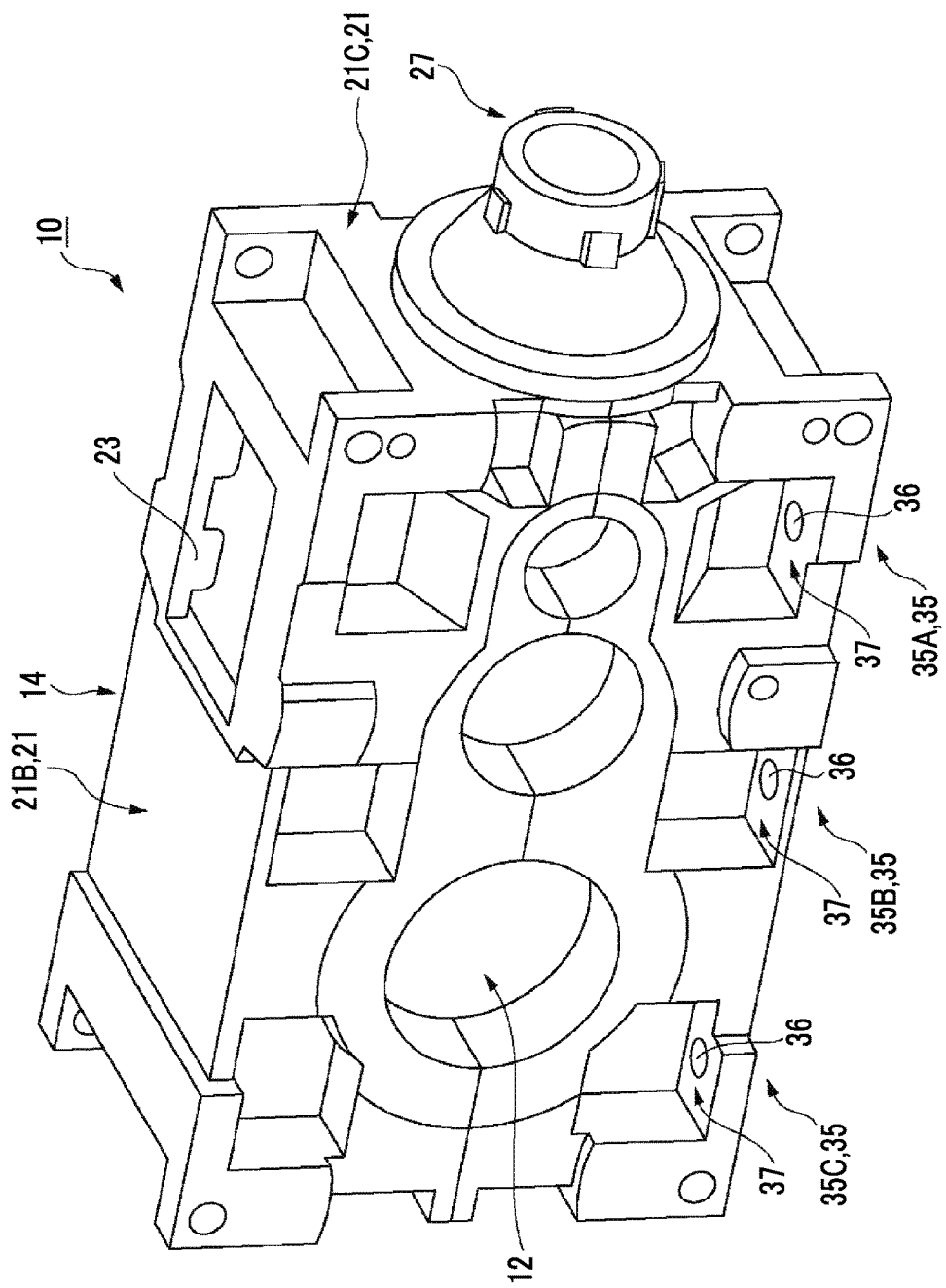
FIG. 5 is a perspective view showing an outline of a gear box according to a second embodiment.
Figure 6:
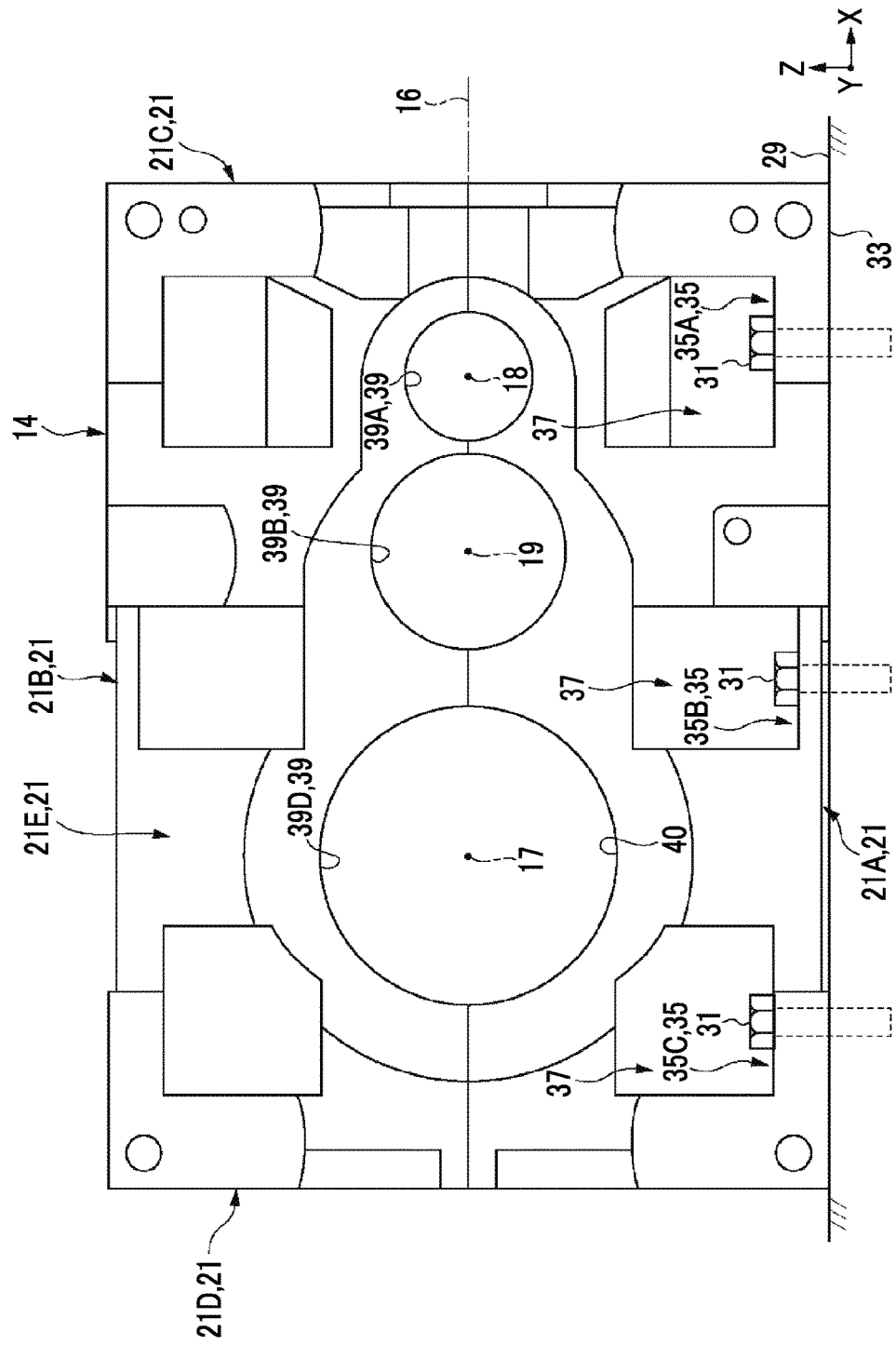
FIG. 6 is a side view showing an outline of the gear box according to the second embodiment.

FIG. 5 is a perspective view showing an outline of a gear box 10 according to a second embodiment, and FIG. 6 is a side view thereof. In embodiments described below, the same reference numerals are assigned to the same elements as those described in the first embodiment, and overlapping descriptions thereof are omitted.

The fixing portion 35 includes the first fixing portion 35A which is provided on the front end portion in the front-rear direction X, the second fixing portion 35B which is provided on the intermediate portion thereof, and a third fixing portion 35C which is provided on the rear end portion.

Figure 7:
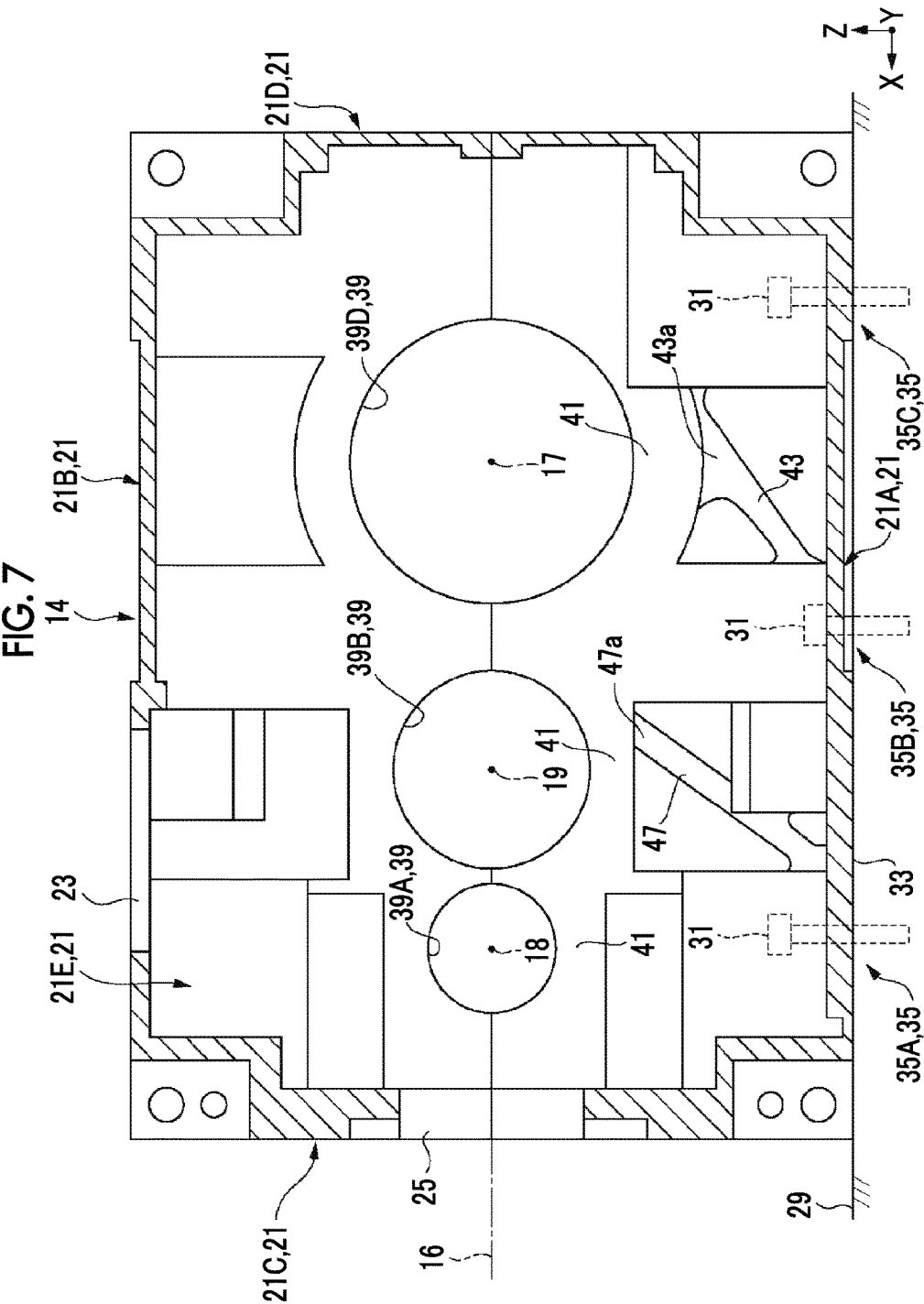
FIG. 7 is a side view showing the internal configuration of the gear box according to the second embodiment.

FIG. 7 is a side view showing the internal configuration of the gear box body 14. An intermediate shaft hole reinforcement rib 47, which extends from the peripheral edge portion 41 of the second intermediate shaft hole 39B toward the first fixing portion 35A, is formed on the inner surface side of the lateral side wall portion 21E. In addition, the output hole reinforcement rib 43, which extends from the peripheral edge portion 41 of the output shaft hole 39D toward the second fixing portion 35B, is formed on the inner surface side of the lateral side wall portion 21E. When the gear box body 14 is viewed from the side, the ribs 43 and 47 are formed to linearly extend in approximately the same direction as each other.

One end portion 47a of the intermediate shaft hole reinforcement rib 47 extends to the peripheral edge portion 41 of the second intermediate shaft hole 39B and is connected to the peripheral edge portion 41. One end portion 43a of the output hole reinforcement rib 43 extends to the peripheral edge portion 41 of the output shaft hole 39D and is connected to the peripheral edge portion 41.

Figure 8:
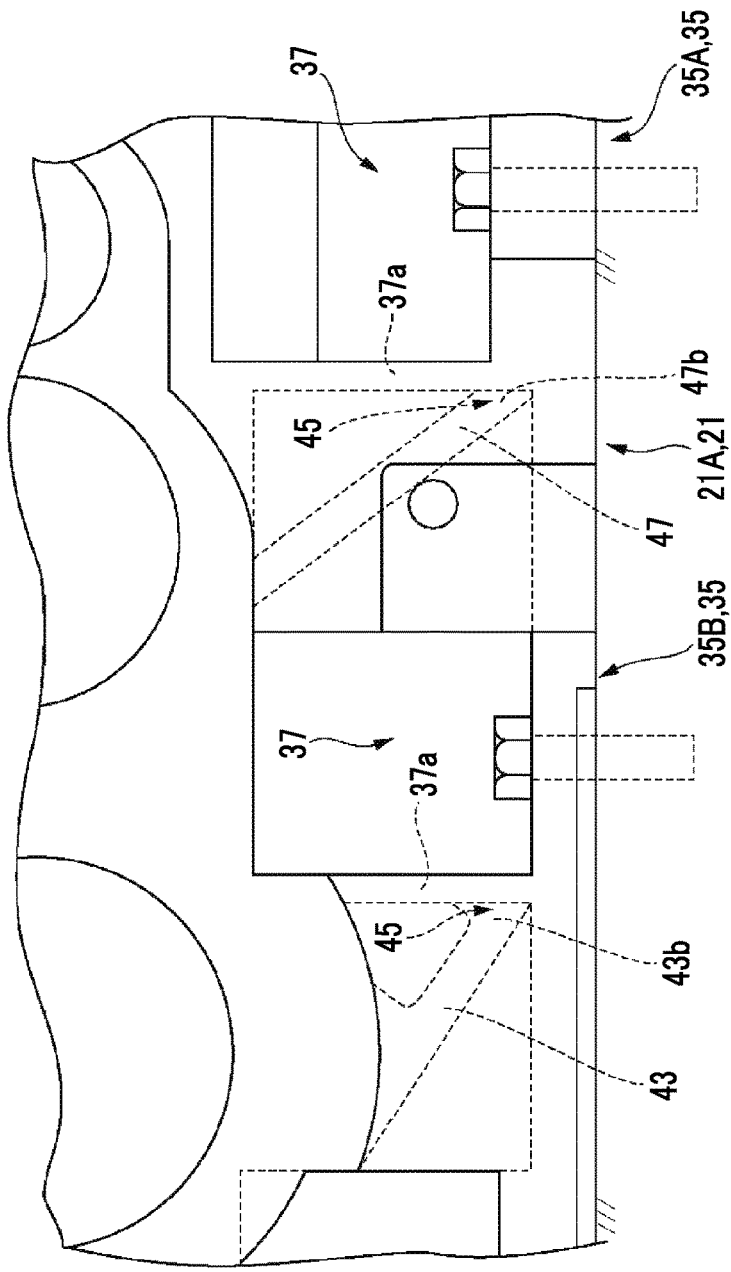
FIG. 8 is an enlarged side view showing an outline of the gear box according to the second embodiment.

FIG. 8 is an enlarged side view showing the outline of the gear box 10. The other end portion 47b of the intermediate shaft hole reinforcement rib 47 extends to the corner portion 45 between the side surface portion 37a of the recessed portion 37 of the first fixing portion 35A and the lower side wall portion 21A, and is connected to the corner portion 45. The other end portion 43b of the output hole reinforcement rib 43 extends to the corner portion 45 between the side surface portion 37a of the recessed portion 37 of the second fixing portion 35B and the lower side wall portion 21A, and is connected to the side surface portion 37a of the recessed portion 37.

The gear box 10 according to the present embodiment also has the same effects as those of the gear box 10 according to the first embodiment.

Third Embodiment

Figure 9:
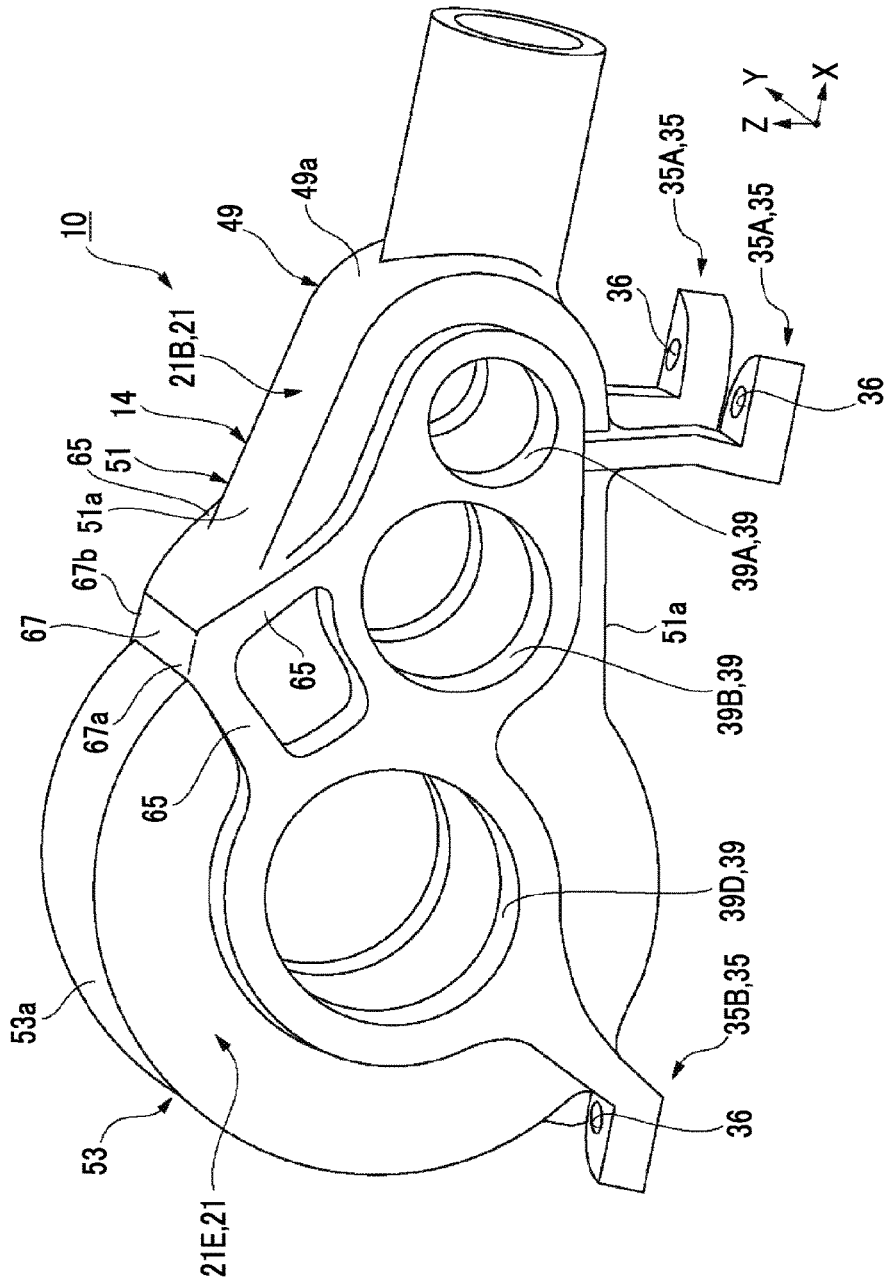
FIG. 9 is a perspective view showing an outline of a gear box according to a third embodiment.

FIG. 9 is a perspective view showing the outline of a gear box 10 according to a third embodiment. The gear box body 14 includes a first accommodation portion 49, an intermediate portion 51, and a second accommodation portion 53 provided in this order from one side (front side) in the front-rear direction X to the other side (rear side). The first intermediate shaft hole 39A and the second intermediate shaft hole 39B, which are shaft holes 39 different from the output shaft hole 39D, are respectively formed in the first accommodation portion 49 and the intermediate portion 51, and the output shaft hole 39D is formed in the second accommodation portion 53.

Figure 10:
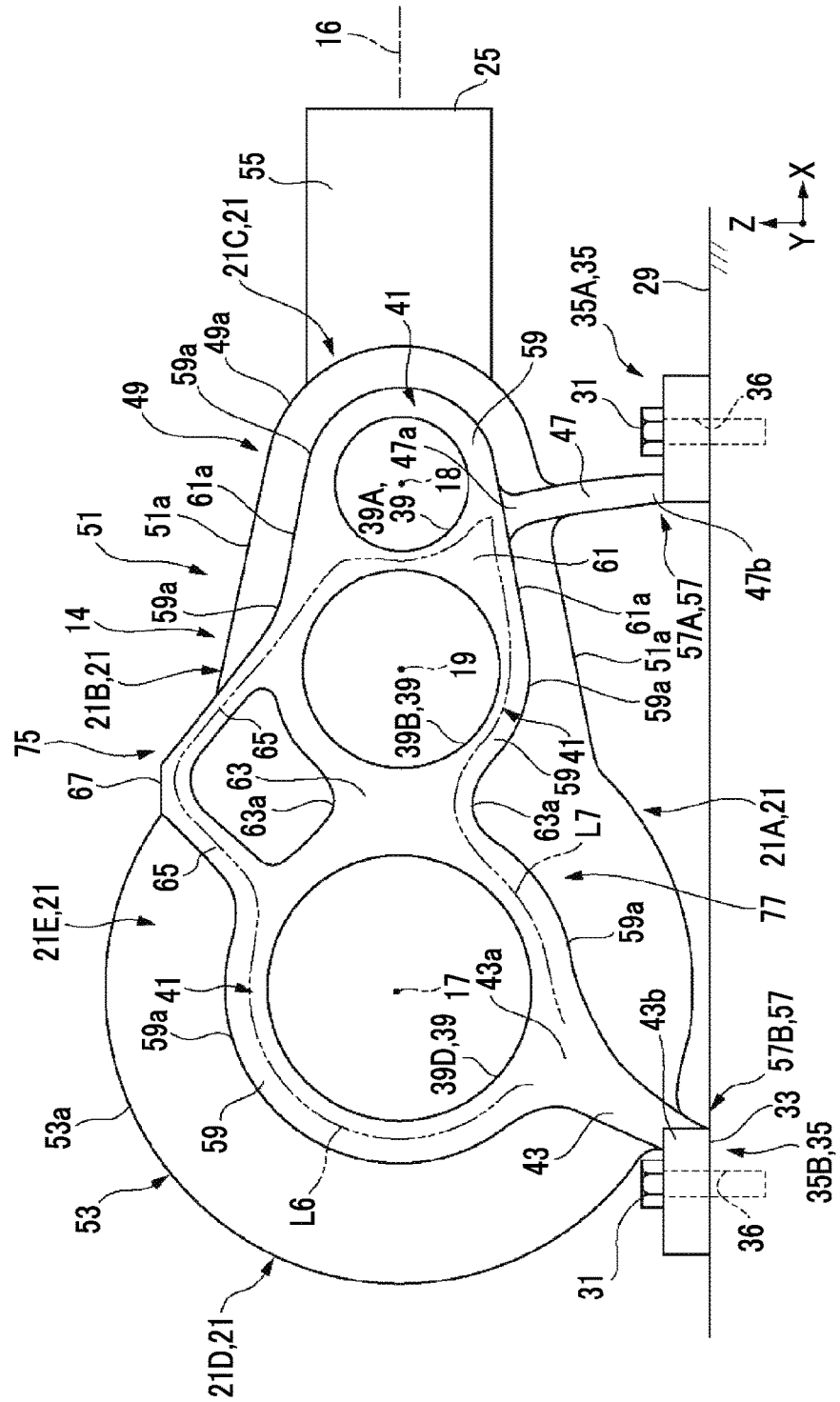
FIG. 10 is a side view showing an outline of the gear box according to the third embodiment.

FIG. 10 is a side view showing the outline of the gear box 10. An outer peripheral surface 49a of the first accommodation portion 49 is formed in a curve shape having a first curvature radius R1 [m], and an outer peripheral surface 53a of the second accommodation portion 53 is formed in a curve shape having a second curvature radius R2 [m] which is greater than the first curvature radius R1. An outer peripheral surface 51a of the intermediate portion 51 is linearly formed so as to smoothly connect the outer peripheral surface 49a of the first accommodation portion 49 to the outer peripheral surface 53a of the second accommodation portion 53.

The outer peripheral surface 49a of the first accommodation portion 49 is formed so as to be along an addendum circle of a gear (not shown) which is attached to the first intermediate shaft 18, and a gear attached to the first intermediate shaft 18 or a gear attached to the input shaft 16 is accommodated in the inner portion of the first accommodation portion 49. A gear attached to the second intermediate shaft 19 is accommodated in the intermediate portion 51. The outer peripheral surface 53a of the second accommodation portion 53 is formed so as to be along an addendum circle of a gear (not shown) attached to the output shaft 17, and the gear attached to the output shaft 17 is accommodated in the inner portion of the second accommodation portion 53.

In the gear box body 14, the lateral side wall portions 21E are formed of wall portions of the first accommodation portion 49, the intermediate portion 51, and the second accommodation portion 53 facing each other in the right-left direction Y, the front side wall portion 21C is formed of a portion of the outer peripheral wall portion of the first accommodation portion 49, and the rear side wall portion 21D is formed of a portion of the outer peripheral wall portion of the second accommodation portion 53. Moreover, in the gear box body 14, the lower side wall portion 21A and the upper side wall portion 21B are formed of wall portions of the first accommodation portion 49, the intermediate portion 51, and the second accommodation portion 53 facing each other in the up-down direction Z.

In the front side wall portion 21C, a tubular portion 55 which protrudes forward in the front-rear direction X is formed, and an input shaft hole 25 into which the input shaft 16 is inserted is formed on the tip side of the tubular portion 55. The input shaft 16 is supported by the inner wall surface of the tubular portion 55 via a bearing (not shown) which is assembled into the tubular portion 55.

Leg portions 57, which protrude in a direction away from the lower side wall portion 21A, are provided on the lower side wall portion 21A. The leg portions 57 are provided on both sides of the lower side wall portion 21A in the right-left direction Y. The leg portion 57 includes a first leg portion 57A which is provided on the front end side in the front-rear direction X, and a second leg portion 57B which is provided on the rear end side thereof. The first leg portion 57A and the second leg portion 57B are provided so as to be away from each other in the front-rear direction X.

In each leg portion 57, a flat plate-shaped fixing portion 35 for installing the gear box body 14 on the installation surface 29 is formed on the tip side of the leg portion 57. The fixing portion 35 includes a first fixing portion 35A which is provided on the tip side of the first leg portion 57A and the second fixing portion 35B which is provided on the tip side of the second leg portion 57B. The first fixing portion 35A and the second fixing portion 35B are provided so as to be away from each other in the front-rear direction X.

A shaft hole rib 59 is formed on the peripheral edge portion 41 of each shaft hole 39 on the outer surface side of the lateral side wall portion 21E. The shaft hole rib 59 is annularly formed along the peripheral edge portion 41 of each shaft hole 39, and protrudes outward in the right-left direction Y. The shaft hole ribs 59 of the shaft holes 39 adjacent to each other are provided so as to be partially continued. Specifically, a first rib joining portion 61 which joins the shaft hole rib 59 of the first intermediate shaft hole 39A and the shaft hole rib 59 of the second intermediate shaft hole 39B is provided therebetween. An outer peripheral surface 61a of the first rib joining portion 61 is formed in a flat shape, and is provided to smoothly connect the outer peripheral surfaces 59a of the shaft hole ribs 59. In addition, a second rib joining portion 63 which joins the shaft hole rib 59 of the second intermediate shaft hole 39B and the shaft hole rib 59 of the output shaft hole 39D is provided therebetween. An outer peripheral surface 63a of the second rib joining portion 63 is formed in a recessed curve shape, and is provided to smoothly connect the outer peripheral surfaces 59a of the shaft hole ribs 59.

The intermediate shaft hole reinforcement rib 47 which linearly extends from the peripheral edge portion 41 of the first intermediate shaft hole 39A toward the first fixing portion 35A is formed on the outer surface side of the lateral side wall portion 21E. One end portion 47a of the intermediate shaft hole reinforcement rib 47 is connected to the shaft hole rib 59 of the first intermediate shaft hole 39A, and the other end portion 47b thereof is connected to the first fixing portion 35A. A portion of the first leg portion 57A is formed of the intermediate shaft hole reinforcement rib 47. The intermediate shaft hole reinforcement rib 47 is formed so as to be inclined to the installed surface 33.

The output hole reinforcement rib 43 which linearly extends from the peripheral edge portion 41 of the output shaft hole 39D toward the second fixing portion 35B is formed on the outer surface side of the lateral side wall portion 21E. One end portion 43a of the output hole reinforcement rib 43 is connected to the shaft hole rib 59 of the output shaft hole 39D. The other end portion 43b of the output hole reinforcement rib 43 is connected to the second fixing portion 35B. The output hole reinforcement rib 43 is formed so as to be inclined to the installed surface 33. The output hole reinforcement rib 43 and the intermediate shaft hole reinforcement rib 47 are formed so as to be inclined to the installed surface 33 in directions opposite to each other. In the inclined angles which are acute angles with respect to the installed surface 33, the angle of the intermediate shaft hole reinforcement rib 47 is greater than the angle of the output hole reinforcement rib 43.

First connection ribs 65, which extend from the peripheral edge portion 41 of the output shaft hole 39D and the peripheral edge portion 41 of the second intermediate shaft hole 39B to the side away from the installed surface 33, are formed on the outer surface side of the lateral side wall portion 21E. The first connection ribs 65 are formed such that the tip sides thereof linearly extend in a direction approaching each other so as to be connected at the corner portion between the lateral side wall portion 21E and the upper side wall portion 21B.

As shown in FIG. 9, an extension rib 67 which extends in the right-left direction Y is formed on the outer surface side of the upper side wall portion 21B. One end portion 67a of the extension rib 67 is connected to the tip portions of the first connection ribs 65 of one lateral side wall portion 21E. The other end portion 67b of the extension rib 67 is connected to the tip portions of the first connection ribs 65 of the other lateral side wall portion 21E. The first connection ribs 65 of the pair of lateral side wall portions 21E are connected to each other via the extension rib 67. When thrust loads of the intermediate shafts 18 and 19 or the output shaft 17 in the axial direction act on the gear box body 14 and the peripheral edge portion 41 of each shaft hole 39 is deformed in an out-plane direction (right-left direction Y), the deformation is effectively prevented by the extension rib 67, and adverse influences in engagement of gears are prevented.

In the output hole reinforcement rib 43 and the intermediate shaft hole reinforcement rib 47, the one end portions 43a and 47a thereof are connected to each other by the first connection rib 75 and the second connection rib 77. In FIG. 10, positions, through which the first connection rib 75 and the second connection rib 77 pass, are indicated by double-dashed lines L6 and L7.

The first connection rib 75 is formed of a portion of the shaft hole rib 59 of the output shaft hole 39D, each of the first connection ribs 65, a portion of the shaft hole rib 59 of the second intermediate shaft hole 39B, and the first rib joining portion 61. The second connection rib 77 is formed of a portion of the shaft hole rib 59 of the output shaft hole 39D, each of the second connection ribs 63, a portion of the shaft hole rib 59 of the second intermediate shaft hole 39B, and the first rib joining portion 61.

The output hole reinforcement rib 43, the first connection rib 75, and the intermediate shaft hole reinforcement rib 47 are provided such that ribs 43, 75, and 47 are continuous to one another from the second fixing portion 35B toward the first fixing portion 35A. In addition, the output hole reinforcement rib 43, the second connection rib 77, and the intermediate shaft hole reinforcement rib 47 are also provided such that ribs 43, 77, and 47 are continuous to one another from the second fixing portion 35B toward the first fixing portion 35A.

According to the above-described gear box 10, if power is applied to gears in a state where the fixing portions 35 are fixed to the installed surface 33, excessive loads from the shafts 17 to 19 easily act on the inner wall surfaces of the shaft holes 39, and excessive stresses easily act on the vicinities of the fixing portions 35 positioned around the shaft holes 39. With respect to this, according to the present embodiment, the output hole reinforcement rib 43 or the intermediate shaft hole reinforcement rib 47 can effectively resist the excessive loads, and deformation of each shaft hole 39 in the right-left direction Y or the up-down direction Z is easily prevented. In addition, since it is possible to effectively resist the excessive loads by the ribs 43 and 47, stress acting on the vicinity of each fixing portion 35 can be released, and the deformation is easily prevented. Accordingly, stiffness and load resistance of the gear box 10 are easily secured. Therefore, it is not necessary to excessively increase the plate thickness of the lateral side wall portion 21E in order to resist the loads, and according to a decrease in the plate thickness of each side wall portion 21, the weight of the gear box body 14 is decreased while strength thereof is secured.

In addition, in the present embodiment, since the first accommodation portion 49 or the second accommodation portion 53 of the gear box body 14 is formed, compared to a case where the gear box body 14 is formed in a rectangular parallelepiped shape, a used amount of member decreases, and the weight of the gear box body 14 is decreased.

In addition, since the first connection rib 75 or the second connection rib 77 is formed, loads acting on the peripheral edge portion 41 of each shaft hole 39 are distributed by each of the connection ribs 75 and 77, the intermediate shaft hole reinforcement rib 47, and the output hole reinforcement rib 43 so as to be easily transmitted, and occurrence of concentration in stress due to the loads is prevented.

Fourth Embodiment

Figure 11:
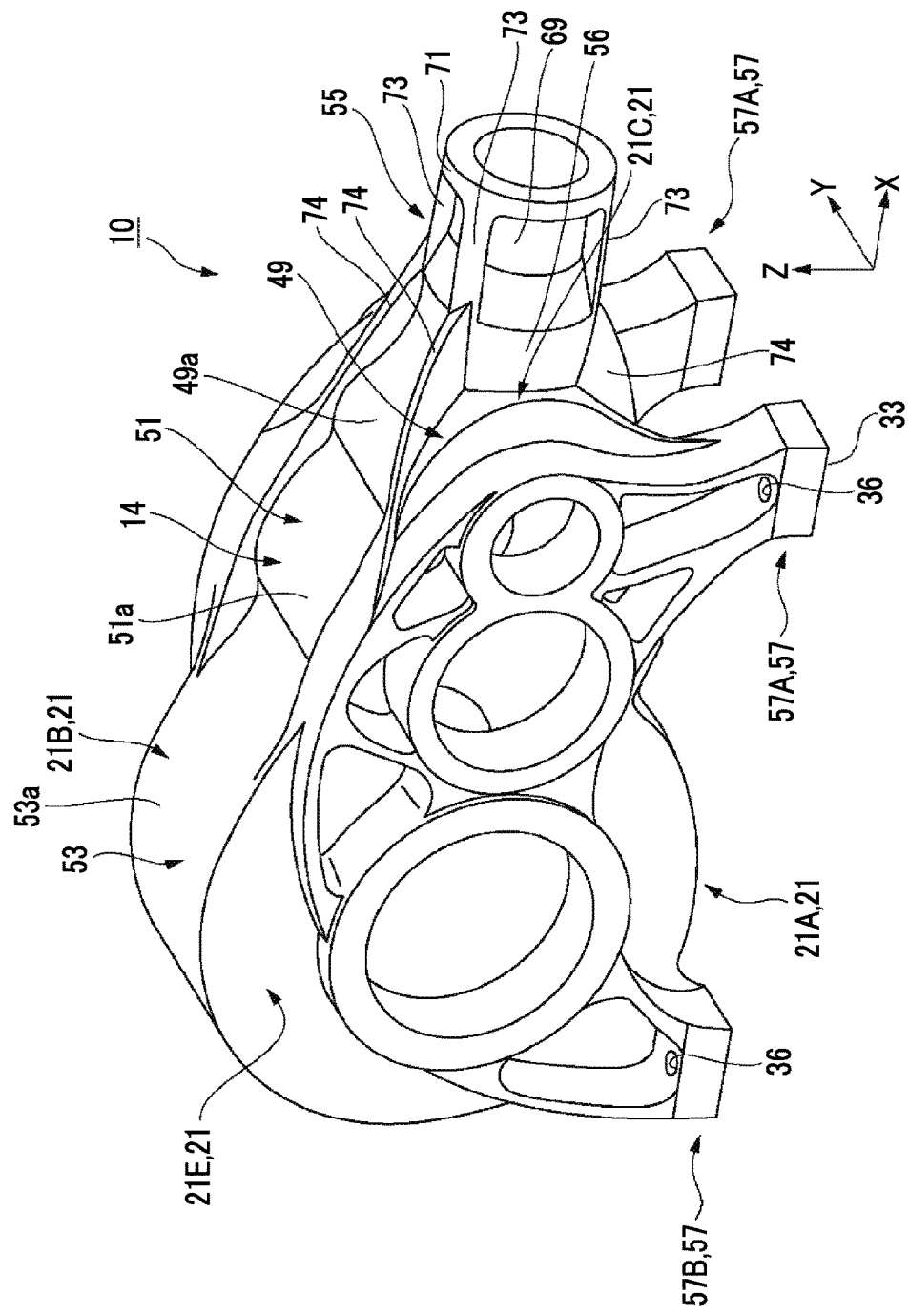
FIG. 11 is a perspective view showing an outline of a gear box according to a fourth embodiment.

FIG. 11 is a perspective view showing an outline of a gear box 10 according to a fourth embodiment. Similarly to the third embodiment, the gear box body 14 includes the first accommodation portion 49, the intermediate portion 51, and the second accommodation portion 53 which are provided in this order from one side toward the other side in the front-rear direction X.

Figure 12:
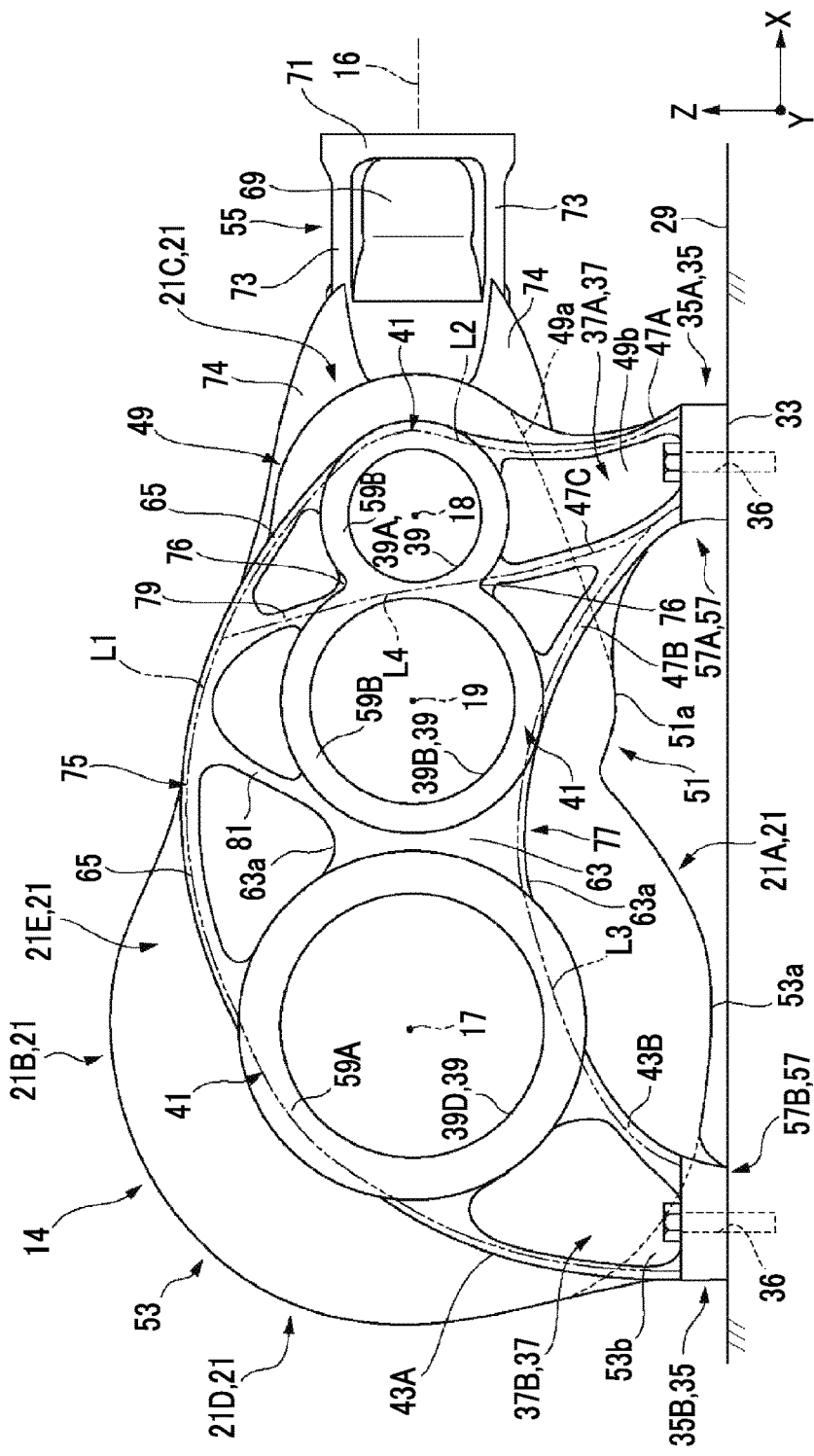
FIG. 12 is a side view showing an outline of the gear box according to the fourth embodiment.

FIG. 12 is a side view showing the outline of the gear box 10. Similarly to the third embodiment, leg portions 57, which protrude in a direction away from the lower side wall portion 21A, are provided on the lower side wall portion 21A of the gear box body 14. The leg portions 57 include the first leg portion 57A and the second leg portion 57B which are provided so as to be away from each other in the front-rear direction X. The first fixing portion 35A is provided on the tip side of the first leg portion 57A, and the second fixing portion 35B is provided on the tip side of the second leg portion 57B. The first fixing portion 35A and the second fixing portion 35B are provided so as to be away from each other in the front-rear direction X.

A partial wall portion 49b configuring the lateral side wall portion 21E of the first accommodation portion 49 is formed to extend toward the first fixing portion 35A, and the first leg portion 57A is configured of the partial wall portion 49b. A partial wall portion 53b configuring the lateral side wall portion 21E of the second accommodation portion 53 is formed to extend toward the second fixing portion 35B, and the second leg portion 57B is configured of the partial wall portion 53b.

As shown in FIG. 11, the upper outer peripheral surface 51a of the intermediate portion 51 is formed on the upper side wall portion 21B of the gear box body 14 so as to be a curve shape protruding outward with respect to the installed surface 33. The upper outer peripheral surface 51a of the intermediate portion 51 is provided so as to smoothly connect the outer peripheral surface 49a of the first accommodation portion 49 and the peripheral surface 53a of the second accommodation portion 53. When thrust loads of the intermediate shafts 18 and 19 or the output shaft 17 in the axial direction act on the gear box body 14 and the peripheral edge portion 41 of each shaft hole 39 is deformed in the out-plane direction (right-left direction Y), the deformation is effectively prevented by the upper outer peripheral surface 51a of the intermediate portion 51, and adverse influences in engagement of gears are prevented.

As shown in FIG. 12, the lower outer peripheral surface 51a of the intermediate portion 51 is provided so as to smoothly connect the outer peripheral surface 49a of the first accommodation portion 49 and the outer peripheral surface 53a of the second accommodation portion 53.

As shown in FIG. 11, in the tubular portion 55 of the front side wall portion 21C, a diameter reduced portion 69 is formed at a position which is deviated from the base end portion 56 toward the tip side. An annular tip rib 71 which protrudes toward the outside in the radial direction along the circumferential direction of the tubular portion 55 is formed on the tip portion of the diameter reduced portion 69 of the tubular portion 55. Multiple first shaft ribs 73 are formed on the outer peripheral surface of the diameter reduced portion 69 of the tubular portion 55 at intervals in the circumferential direction. Each of the first shaft ribs 73 is formed along the axial direction of the tubular portion 55, and the tip portion of the first shaft rib 73 is connected to the tip rib 71. Multiple second shaft ribs 74 are formed on the outer peripheral surface of the base end portion 56 of the tubular portion 55 at intervals in the circumferential direction. The tip portion of the second shaft rib 74 is connected to the base end portion of the first shaft rib 73, and the base end portion extends to the corner portion between the upper side wall portion 21B and the lateral side wall portion 21E and is connected to the corner portion. The second shaft rib 74 is formed so that the protrusion height is greater than that of the first shaft rib 73. Cross-sectional deformation of the tubular portion 55 is effectively prevented by the tip rib 71 or the shaft ribs 73 and 74.

As shown in FIG. 12, the second intermediate shaft hole 39B and the first intermediate shaft hole 39A are provided on the outer surface side of the lateral side wall portion 21E in this order toward the side away from the output shaft hole 39D in the front-rear direction X. As shown in FIG. 12, the shaft hole ribs 59 of the shaft holes 39 adjacent to each other (collectively referred to as a second shaft hole rib 59B) are provided so as to be partially continued. Specifically, the shaft hole rib 59 of the first intermediate shaft hole 39A and the shaft hole rib 59 of the second intermediate shaft hole 39B are annularly formed along the peripheral edge portions 41 of the shaft holes 39A and 39B, and are provided so as to partially overlap each other, and an overlapping rib portion 76 is formed on the overlapping position. The shaft hole rib 59 of the output shaft hole 39D is annularly formed along the peripheral edge portion 41 of the output shaft hole 39D. Similarly to the third embodiment, the second rib joining portion 63 (also referred to as a linking rib 63) which joins the shaft hole rib 59 of the second intermediate shaft hole 39B and the shaft hole rib 59 of the output shaft hole 39D (also referred to as a first shaft hole rib 59A) is provided therebetween. As shown in FIG. 11, a protrusion height of the first shaft hole rib 59A from the side wall portion 21E is greater than a protrusion height of the linking rib 63. An outer peripheral surface 63a of the second rib joining portion 63 is formed in a recessed curve shape.

The recessed portions 37 are formed at positions deviated in a direction away from the installed surface 33 with respect to the fixing portion 35 on the outer surface side of the lateral side wall portion 21E. The recessed portion 37 includes a first recessed portion 37A which is formed at the position deviated in a direction away from the installed surface 33 with respect to the first fixing portion 35A, and a second recessed portion 37B which is formed at the position deviated in a direction away from the installed surface 33 with respect to the second fixing portion 35B. The first recessed portion 37A is defined by the first fixing portion 35A, a first intermediate shaft hole reinforcement rib 47A and a second intermediate shaft hole reinforcement rib 47B described below, and the lateral side wall portion 21E. The second recessed portion 37B is defined by the second fixing portion 35B, a first output hole reinforcement rib 43A and a second output hole reinforcement rib 43B described below, and the lateral side wall portion 21E.

The first intermediate shaft hole reinforcement rib 47A which extends from the peripheral edge portion 41 of the first intermediate shaft hole 39A toward the first fixing portion 35A, and the second intermediate shaft hole reinforcement rib 47B which extends from the peripheral edge portion 41 of the second intermediate shaft hole 39B toward the first fixing portion 35A are formed on the outer surface side of the lateral side wall portion 21E. One end portion of the first intermediate shaft hole reinforcement rib 47A is connected to the shaft hole rib 59 of the first intermediate shaft hole 39A, and the other end portion thereof is connected to the first fixing portion 35A. One end portion of the second intermediate shaft hole reinforcement rib 47B is connected to the shaft hole rib 59 of the second intermediate shaft hole 39B, and the other end portion thereof is connected to the first fixing portion 35A. The intermediate shaft hole reinforcement ribs 47A and 47B are formed so as to be inclined with respect to the installed surface 33. In the inclined angles which are acute angles with respect to the installed surface 33, the angle of the first intermediate shaft hole reinforcement rib 47A is greater than the angle of the second intermediate shaft hole reinforcement rib 47B.

The first output hole reinforcement rib 43A which extends from the peripheral edge portion 41 of the output shaft hole 39D toward the second fixing portion 35B, and the second output hole reinforcement rib 43B which extends from a location different from the peripheral edge portion 41 toward the second fixing portion 35B are formed on the outer surface side of the lateral side wall portion 21E. One end portion of each output hole reinforcement rib 43A is connected to the shaft hole rib 59 of the output shaft hole 39D, and the other end portion thereof is connected to the second fixing portion 35B. The output hole reinforcement ribs 43A and 43B are formed so as to be inclined with respect to the installed surface 33. In the inclined angles which are acute angles with respect to the installed surface 33, the angle of the first output hole reinforcement rib 43A is greater than the angle of the second output hole reinforcement rib 43B.

The first connection ribs 65 (also referred to as a first output hole rib 65 and a second output hole rib 65), which extend from each of the peripheral edge portion 41 of the output shaft hole 39D and the peripheral edge portion 41 of the first intermediate shaft hole 39A to the side away from the installed surface 33, are formed on the outer surface side of the lateral side wall portion 21E. The first connection ribs 65 are formed such that the tip sides thereof extend in a direction approaching each other so as to be connected at the corner portion between the lateral side wall portion 21E and the upper side wall portion 21B.

A portion between the one end portions of the first intermediate shaft hole reinforcement rib 47A and the first output hole reinforcement rib 43A is connected by the first connection rib 75 (also referred to as a first connection rib portion 75). The first connection rib 75 is configured of a portion of the shaft hole rib 59 of the output shaft hole 39D, each of the first connection ribs 65, and a portion of the shaft hole rib 59 of the first intermediate shaft hole 39A. The first connection rib 75 is formed is a curve shape which protrudes outward with respect to the installed surface 33.

The first output hole reinforcement rib 43A, the first connection rib 75, and the first intermediate shaft hole reinforcement rib 47A are provided such that ribs 43A, 75, and 47A are continuous to one another from the second fixing portion 35B toward the first fixing portion 35A. More specifically, the ribs 43A, 75, and 47A are provided such that the ribs 43A, 75, and 47A are positioned along a first arch-shaped virtual line L1 which extends from the second fixing portion 35B to the peripheral edge portion 41 of the first intermediate shaft hole 39A, and a second arch-shaped virtual line L2 which extends from the peripheral edge portion 41 of the first intermediate shaft hole 39A to the first fixing portion 35A. The first virtual line L1 and the second virtual line L2 are provided so as to be continuous to each other in the peripheral edge portion 41 of the first intermediate shaft hole 39A. In addition, the virtual lines L1 and L2 are provided such that the virtual lines L1 and L2 pass through a side far from the installed surface 33 with respect to each shaft hole 39 of the lateral side wall portion 21E, and pass through the peripheral edge portion 41 of any one of the shaft holes 39. In the present embodiment, the virtual lines L1 and L2 are provided so as to pass through the peripheral edge portions 41 of the first intermediate shaft hole 39A and the output shaft hole 39D. The first connection rib 75 is also provided so as to pass through the side far from the installed surface 33 with respect to each shaft hole 39.

A portion between the one end portions of the second intermediate shaft hole reinforcement rib 47B and the second output hole reinforcement rib 43B is connected by the second connection rib 77 (also referred to as a second connection rib portion 77). The second connection rib 77 is configured of a portion of the shaft hole rib 59 of the output shaft hole 39D, the second rib joining portion 63, and a portion of the shaft hole rib 59 of the second intermediate shaft hole 39B.

The second output hole reinforcement rib 43B, the second connection rib 77, and the second intermediate shaft hole reinforcement rib 47B are provided such that ribs 43B, 77, and 47B are continuous to one another from the second fixing portion 35B toward the first fixing portion 35A. More specifically, the ribs 43B, 77, and 47B are provided such that the ribs 43B, 77, and 47B are positioned along a third arch-shaped virtual line L3 which extends from the first fixing portion 35A to the second fixing portion 35B. In addition, the third virtual line L3 is provided such that the third virtual line L3 passes through a side close to the installed surface 33 with respect to each shaft hole 39 of the lateral side wall portion 21E, and passes through the peripheral edge portion 41 of any one of the shaft holes 39. In the present embodiment, the third virtual line L3 is provided so as to pass through the peripheral edge portion 41 of the second intermediate shaft hole 39B and the output shaft hole 39D. The second connection rib 77 is also provided so as to pass through the side close to the installed surface 33 with respect to each shaft hole 39.

A third shaft hole reinforcement rib 47C, which extends from the overlapping rib portion 76 positioned at a position at which the peripheral edge portions 41 of the first intermediate shaft hole 39A and the second intermediate shaft hole 39B overlap each other toward the first fixing portion 35A, is formed on the outer surface side of the lateral side wall portion 21E. One end portion of the third shaft hole reinforcement rib 47C is connected to shaft hole ribs 59 of the first intermediate shaft hole 39A and the second intermediate shaft hole 39B, and the other end portion thereof is connected to the end portion of the second intermediate shaft hole reinforcement rib 47B.

A second connection rib 79 (also referred to as a second linking rib portion 79) which extends from the overlapping rib portion 76 positioned at a position at which the peripheral edge portions 41 of the first intermediate shaft hole 39A and the second intermediate shaft hole 39B overlap each other toward the first connection rib 65, is formed on the outer surface side of the lateral side wall portion 21E. One end portion of the second connection rib 79 is connected to the shaft hole ribs 59 of the first intermediate shaft hole 39A and the second intermediate shaft hole 39B, and the other end portion thereof is connected to the first connection rib 65. The third shaft hole reinforcement rib 47C and the second connection rib 79 are provided such that the ribs 47C and 79 are positioned along a fourth virtual line L4 which extends from the first connection rib 65 toward the first fixing portion 35A via the position at which the peripheral edge portions 41 of the shaft holes 39 overlap each other.

A third connection rib 81 (also referred to as a first linking rib portion 81), which extends from theperipheral edge portion 41 of the second intermediate shaft hole 39B toward the first connection rib 65, is formed on the outer surface side of the lateral side wall portion 21E. One end portion of the third connection rib 81 is connected to the shaft hole rib 59 of the second intermediate shaft hole 39B, and the other end portion thereof is connected to the first connection rib 65. The second connection rib 79 and the third connection rib 81 are formed such that the tip sides thereof extend in the direction approaching each other.

According to the gear box 10 of the above-described embodiment, effects similar to those of the gear box 10 according to the third embodiment are obtained. In addition, since the first connection rib 75 is formed, loads acting on the peripheral edge portions 41 of the first intermediate shaft hole 39A and the output shaft hole 39D are distributed by the first connection rib 75, the first intermediate shaft hole reinforcement rib 47A, or the first output hole reinforcement rib 43A so as to be easily transmitted, and occurrence of concentration in stress due to the loads is prevented. Particularly, since the first connection rib 75 is formed in a curve shape which protrudes outward with respect to the installed surface 33, the loads acting on the vicinity of the first connection rib 75 are more effectively distributed easily. In addition, since the ribs 75, 47A, and 43A are provided so as to be positioned along the first arch-shaped virtual line L1 and the second arch-shaped virtual line L2, the loads acting on the vicinities of the ribs 75, 47A, and 43A are more effectively distributed easily.

Moreover, since the second connection rib 77 is formed, loads acting on the peripheral edge portion 41 of the second intermediate shaft hole 39B or the output shaft hole 39D are distributed by the second connection rib 77, the second intermediate shaft hole reinforcement rib 47B, or the second output hole reinforcement rib 43B so as to be easily transmitted, and occurrence of concentration in stress due to the loads is prevented. Particularly, since the ribs 77, 47B, and 43B are provided so as to be positioned along the third arch-shaped virtual line L3, the loads acting on the vicinities of the ribs 77, 47B, and 43B are more effectively distributed easily.

In addition, in each leg portion 57, the ribs which extends to the peripheral edge portion 41 of any one shaft hole 39 of the plurality of shaft holes 39 are disposed at intervals in the front-rear direction X. In the first leg portion 57A, the first intermediate shaft hole reinforcement rib 47A and the second intermediate shaft hole reinforcement rib 47B are formed at intervals in the front-rear direction X. In the second leg portion 57B, the first output hole reinforcement rib 43A and the second output hole reinforcement rib 43B are formed at intervals in the front-rear direction X. Accordingly, deformation of the peripheral edge portion 41 of the shaft hole 39 positioned in the vicinity of the leg portion 57 or the leg portion 57 is effectively prevented by each rib.

Hereinbefore, the present invention is described with reference to the embodiments. However, the embodiments are suggested so as to only describe principles or applications of the present invention. In addition, various modification examples or changes of positions can be applied to the embodiments within a scope which does not depart from the gist of the present invention defined by claims.

The case where the gear box 10 according to the above-described embodiments is used in the speed reducer is described. However, the gearbox 10 maybe used in a transmission different from a speed reducer as long as it is a gear device which accommodates gears.

The case is described, in which the gear box bodies 14 according to the above-described embodiments are used in an orthogonal axis speed reducer in which the shafts 17 to 20 inserted into the shaft holes 39 of the lateral side wall portion 21E and the input shaft 16 inserted into the input shaft hole 25 of the front side wall portion 21C are orthogonal to each other. However, the gear box bodies 14 may be used in a parallel axis speed reducer in which the input shaft hole 25 and the shaft holes 39 are formed on the lateral side wall portion 21E, and the shafts 17 to 20 inserted into the shaft holes 39 and the input shaft 16 inserted into the input shaft hole 25 are parallel with each other. In addition, the number of the shaft holes 39 formed in the gear box body 14, or the number of the shafts supported by the shaft holes 39 of the gear box body 14 via the bearings is not particularly limited.

The present invention relates to a gear box which is used in a speed reducer or the like.

It should be understood that the invention is not limited to the above-described embodiment, but may be modified into various forms on the basis of the spirit of the invention. Additionally, the modifications are included in the scope of the invention.

What is claimed is:

1. A gear box, comprising:
a gear box body for accommodating a gear;
a plurality of shaft holes which are formed on a side wall portion of the gear box body to support a shaft, the plurality of shaft holes including a first shaft hole for supporting an output shaft and a second shaft hole; and
a fixing portion which is provided in the gear box body and on which a fixing member for installing the gear box body on an installation surface parallel to the shaft is mounted, the installation surface being a surface to which the gear box may be fixed,
wherein the fixing portion includes:
a first fixing portion that is provided on one side in one direction parallel to the installation surface, and
a second fixing portion which is provided on another side in the one direction,
wherein the side wall portion includes:
a shaft hole reinforcement rib that extends from a peripheral edge portion of the second shaft hole toward the first fixing portion,
an output hole reinforcement rib that extends from a peripheral edge portion of the first shaft hole toward the second fixing portion, and
a connection rib which connects the shaft hole reinforcement rib to the output hole reinforcement rib, and
wherein the shaft hole reinforcement rib, the output hole reinforcement rib, and the connection rib are provided so as to be continuous with one another along an arch-shaped virtual line from the second fixing portion toward the first fixing portion.

2. The gear box according to claim 1,
wherein the output hole reinforcement rib is formed so as to be inclined with respect to the installation surface.

3. The gear box according to claim 1,
wherein the connection rib is provided to pass closer to the installation surface than the plurality of shaft holes.

4. The gear box according to claim 1,
wherein the connection rib is provided to pass farther from the installation surface than the plurality of shaft holes.

5. The gear box according to claim 1,
wherein the connection rib includes a shaft hole rib which is provided in the peripheral edge portion of the second shaft hole.

6. The gear box according to claim 1,
wherein the connection rib is formed in a curve shape which protrudes outward with respect to the installation surface.

7. The gear box according to claim 1,
wherein the gear box body includes:
a lateral side wall portion on which the plurality of shaft holes, the output hole reinforcement rib, the connection rib, and the shaft hole reinforcement rib are formed,
lower side wall portion which faces the installation surface, and
a leg portion which protrudes from the lower side wall portion,
wherein the leg portion includes a first leg portion and a second leg portion which are displaced from each other in the one direction, and wherein the first fixing portion is provided on a tip side of the first leg portion, and the second fixing portion is provided on a tip side of the second leg portion.

8. The gear box according to claim 7,
wherein the shaft hole reinforcement rib is one of a plurality of shaft hole reinforcement ribs, each of which are formed on the first leg portion at intervals in the one direction, and
wherein the first fixing portion includes a fixation target portion for fixation to the installation surface between the plurality of shaft hole reinforcement ribs.

9. The gear box according to claim 7,
wherein the output hole reinforcement rib is one of a plurality of output hole reinforcement ribs, each of which are formed on the second leg portion at intervals in the one direction, and
wherein the second fixing portion includes a fixation target portion for fixation to the installation surface between the plurality of output hole reinforcement ribs.

10. The gear box according to claim 1,
wherein the shaft hole reinforcement rib is formed of two ribs that extend from the peripheral edge portion of the second shaft hole and join so as to be connected to the first fixing portion.

11. The gear box according to claim 1,
wherein the connection rib includes a first shaft hole rib provided on the peripheral edge portion of the first shaft hole, a second shaft hole rib provided on the peripheral edge portion of the second shaft hole, and a linking rib that connects the first shaft hole rib to the second shaft hole rib, and
a protrusion height of the first shaft hole rib from the side wall portion is greater than a protrusion height of the linking rib from the side wall portion.

12. The gear box according to claim 1,
wherein the connection rib includes a first rib portion that passes farther from the installation surface than the plurality of shaft holes and a second connection rib portion that passes closer to the installation surface than the plurality of shaft holes,
wherein the shaft hole reinforcement rib includes a first shaft hole reinforcement rib portion continuous with the first connection rib portion and a second shaft hole reinforcement rib portion continuous with the second connection rib portion, and
wherein the output hole reinforcement rib includes a first output hole reinforcement rib portion continuous with the first connection rib portion and a second output hole reinforcement rib portion continuous with the second connection rib portion.

13. The gear box according to claim 1,
wherein the connection rib includes a first output hole rib provided on the peripheral edge portion of the first shaft hole, a second output hole rib provided on the peripheral edge portion of the second shaft hole, and a linking rib that connects the first output hole rib to the second output hole rib, and
wherein the linking rib includes a first linking rib portion extending from both the first output hole rib and the second output hole rib in a direction away from the installation surface, and a second linking rib portion connected to the first linking rib portion and the second output hole rib.

14. The gear box according to claim 1,
wherein the gear box body includes a tubular portion that protrudes in the one direction and that has an input shaft hole for supporting an input shaft, and
a first shaft rib is formed on an axial portion of the tubular portion.

15. The gear box according to claim 14,
wherein a second shaft rib is provided on a base end portion of the tubular portion, and the second shaft rib has a protrusion height greater than a protrusion height of the first shaft rib.

16. The gear box according to claim 1,
wherein the plurality of shaft holes further includes a third shaft hole, the first shaft hole, the second shaft hole, and the third shaft hole being provided in this order in the one direction,
wherein a first shaft rib hole is provided on the peripheral edge portion of the second shaft hole, and a second shaft hole rib is provided on a peripheral edge portion of the third shaft hole, and
wherein the first shaft hole rib and the second shaft hole rib partially overlap each other at an overlapping position, and an overlapping rib portion is formed on the overlapping position.

\* \* \* \* \*